Patented Aug. 25, 1942

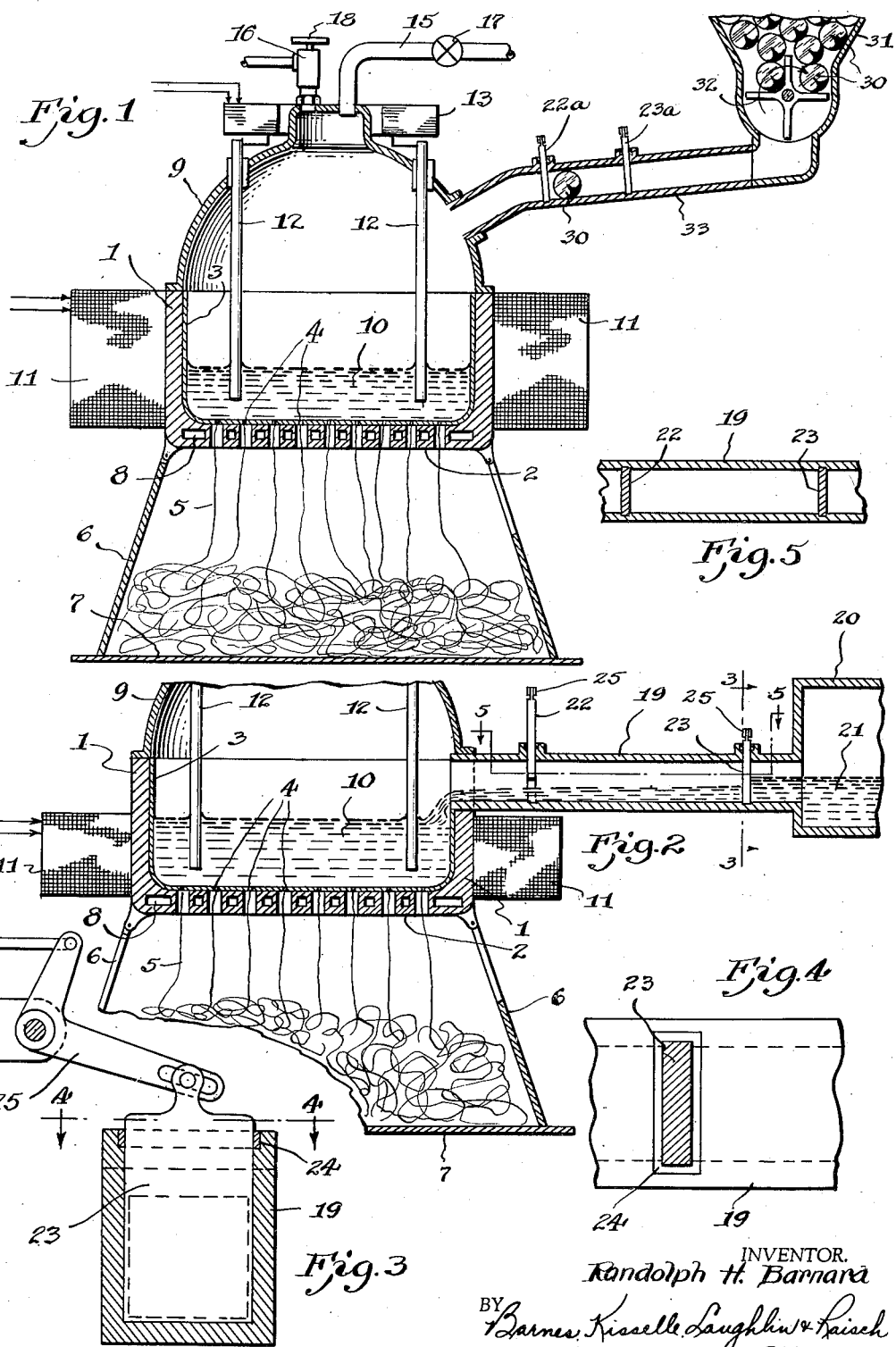

2,294,266

UNITED STATES PATENT OFFICE 2,294,266

GLASS MAKING

Randolph H. Barnard, Toledo, Ohio

Application April 9, 1941, Serial No. 387,572

1 Claim. (Cl. 49—1)

This invention relates to improvements in the art of making glass wool wherein molten glass is extruded or forced through small apertures whereby the same is formed into fine fibrous-like strands which may be accumulated at random in a mat or bat, or formed into any desired predetermined or uniform manner.

The principal object of the invention is to provide for a continuous extruding or forcing of the molten glass from a pressure chamber, to which end the invention provides for the introduction of separate charges of glass into the pressure chamber or extrusion chamber so as to maintain the necessary supply of glass in the chamber. The separate charges are to be introduced into the chamber in such quantities and at such time intervals as to maintain the proper body of molten glass, and the separate charges may be introduced either in solid form or in molten form. The invention provides means for substantially maintaining the pressure in the chamber during the introduction of the separate charges.

Two forms of apparatus are shown in the accompanying drawing for carrying out the invention.

Fig. 1 is a general view largely in cross section illustrating the extrusion chamber with means for furnishing separate charges of glass in solid form.

Fig. 2 is a view similar to Fig. 1 although omitting some detail and showing an arrangement for the introduction of charges of molten glass into the chamber.

Fig. 3 is an enlarged cross sectional view taken substantially on line 3—3 of Fig. 2 showing a control valve.

Fig. 4 is a view partly in section taken substantially on line 4—4 of Fig. 3.

Fig. 5 is a sectional view taken substantially on line 5—5 of Fig. 2.

The extruding chamber illustrated in Fig. 1 is of the same general type as the chamber shown in my Patent No. 2,229,489 of January 21, 1941. The chamber is in the form of a vessel 1 provided with a bottom 2 and preferably having a lining 3. The lining is provided with a multiplicity of apertures 4 through which the glass is forced so as to form the glass wool as indicated by the strands 5. The apertures 4 are small and are of necessity shown too large in the drawing. The vessel may have suitable supports 6 and the glass wool may be collected on a support 7. The body of the chamber 1 may be of ceramic material or of metal capable of withstanding the heat to which it is subjected, and the bottom may be cored to form passageways 8 through which a cooling medium may be circulated. A top piece or closure is shown at 9. The molten glass within the chamber is illustrated at 10 and it may be maintained molten by means of a high frequency inductance coil 11, and electrodes 12 which depend into the glass. The lining 3 is preferably a metallic alloy which will withstand the heat and preferably a platinum alloy known as platinum rhodium. If the body 1 is of metal, the body and the lining may be heated by the electrical inductance coil and this heat conducted into the body of glass, while, if the body 1 is of ceramic material, the lining 3 only is thus heated by electrical inductance. The electrodes connect to a transformer 13, the electrodes carrying a low voltage, high amperage current which passes through the molten glass.

The pressure in the chamber may be maintained and controlled by suitable means, such, for example, as the means illustrated in my above mentioned patent, but for the purposes herein, an air pressure line is indicated at 15 which leads into the chamber, while at 16 is an exhaust valve arranged to exhaust when the pressure reaches a predetermined maximum. The pressure line may be controlled by a suitable valve 17, while the exhaust valve or relief valve 16 may be governed through the means of a regulator 18.

The same pressure chamber structure is shown in Fig. 2 and the reference characters applied to the various parts thereof are the same as the characters used in Fig. 1. In Fig. 2, however, molten glass is supplied to the chamber, while in Fig. 1 solid glass charges are supplied to the chamber.

In the form shown in Fig. 2 the forebay of a glass furnace is illustrated at 20 having molten glass therein at 21 to the level indicated, and a closed conduit 19 connects the forebay with the pressure chamber 1. Control means are provided for controlling the flow of molten glass from the forebay into the pressure chamber, and at the same time arranged so that a pressure can be maintained in the pressure chamber. To this end valve means are provided which may take the form of two slide valves 22 and 23 which may be identical. As shown in Figs. 3 and 5 the slide valve 23 operates in grooves in the sides of the conduit 19 and is arranged to seat in a groove in the bottom wall of the closed conduit. A gasket of suitable material, as illustrated at 24, may embrace all sides of the slide valve where it slides through the wall of the conduit. Any suitable means are provided for elevating and lowering the valve, as for example, a bell crank 25 connected to the valve as illustrated.

The slide valve is preferably of a ceramic material, or it may be of other material so long as it is capable of resisting the heat, and it has an adequately close fit in the slots in which it moves and with the gasket 24 so that the desired pressure may be maintained in the chamber. There may be some leakage past a valve, but this can be more than overcome by the volume of supply of the air pressure through the inlet 15.

For the introduction of separate charges of molten glass, the valves 22 and 23 are alternately operated. As shown in Fig. 2 the valve 22 is open while the valve 23 is closed. The valve 23 is thus maintaining the pressure and withholding the molten glass in the forebay while the molten glass downstream from the valve 23 is flowing into the pressure chamber. After this molten glass has been charged into the chamber the valve 22 is closed and the valve 23 opened so that a body of molten glass flows in between the two valves at the level of the glass in the forebay. The valve 23 may then be closed and the valve 22 opened for the introduction of another charge of molten glass into the chamber. The rapidity with which the charges of glass are introduced into the chamber can be regulated with the rate of discharge of the glass so that the level of molten glass in the chamber can be substantially maintained. Also, the volume of glass in a given charge can be varied, and one factor in this connection is the spacing between the valves 22 and 23.

The charging means shown in Fig. 1 is arranged to supply solidified glass to the chamber in the form of separate pieces or blocks which may advantageously be of spherical form. A supply of spheres or balls (sometimes called marbles) is illustrated at 30 in a hopper 31 equipped with a suitable discharge device or valve 32 for the discharging of one or more balls at a time as desired. A conduit 33 extends from the hopper to the pressure chamber, and it may be inclined so that the balls roll from the hopper to the chamber. Here again two valves may be used and which may be very similar to or identical to the valves 22 and 23. For the purposes herein these valves are shown as being the same as valves 22 and 23 so that the views 3, 4 and 5 apply thereto for detail construction. These valves, however, are indicated at 22a and 23a. The operation is quite similar to the operation of the valves for controlling the molten glass in this: a charge of one or more balls are released from the hopper, and when the valve 23a is opened the charge rolls downwardly against the valve 22a. Then the valve 23a is closed and valve 22a opened, and the charge drops into the molten glass in the pressure chamber where the solid glass is then melted. A new charge of glass is provided by closing the valve 22a and opening the valve 23a, and the release of the balls or marbles from the hopper may be timed to the operation of the valves 22a and 23a.

I claim:

An apparatus for making glass wool which comprises, a closed chamber having a multiplicity of apertures in its bottom wall, said chamber adapted to contain a quantity of molten glass, heating means for keeping the glass in the chamber in a molten condition, means for introducing and maintaining gaseous pressure in the chamber above the molten glass to cause the same to flow downwardly through said multiplicity of apertures, means for maintaining a supply of molten glass at a level above that of the motlen glass in the chamber, a closed conduit connecting into said means below the level of glass therein and connecting into the chamber above the level of molten glass therein whereby the molten glass may flow by gravity to the chamber, two valves in the conduit spaced lengthwise thereof to form a compartment therebetween, each valve adapted to substantially seal the conduit, the conduit being arranged for the flow of molten glass from the said means into the chamber, the upstream valve being arranged to be opened for the passage of molten glass into the compartment while the downstream valve is closed, the downstream valve being arranged to be opened for the passage of molten glass from the compartment into the chamber while the upstream valve is closed whereby a substantially constant gas pressure is maintained in the chamber for the continuous flow of molten glass through said multiplicity of apertures.

RANDOLPH H. BARNARD.